March 28, 1961  B. BERNSTEIN ET AL  2,977,571
SPLIT RING ELECTROACOUSTIC TRANSDUCER
Filed March 26, 1952  4 Sheets-Sheet 1
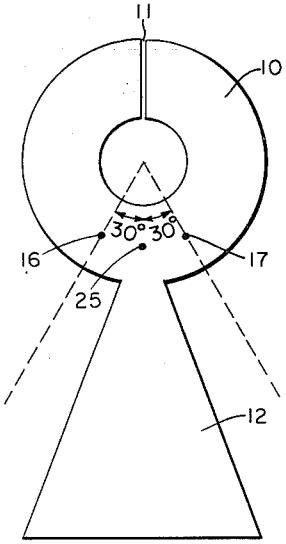
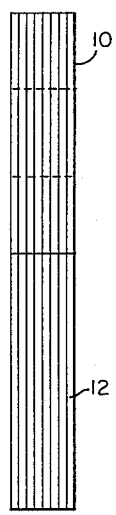
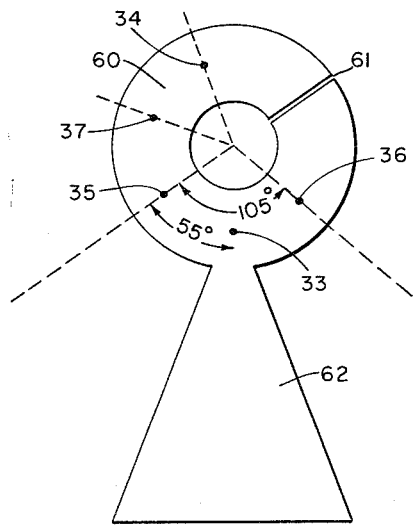
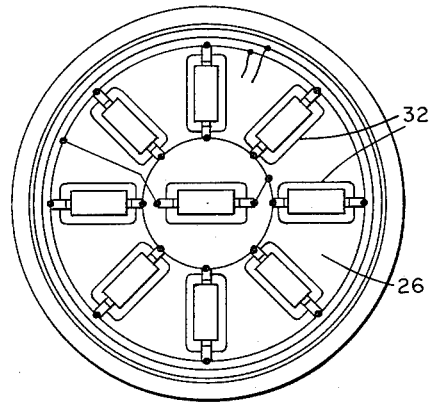
INVENTORS
BERNARD BERNSTEIN
JOHN CHERVENAK
BY
ATTORNEYS

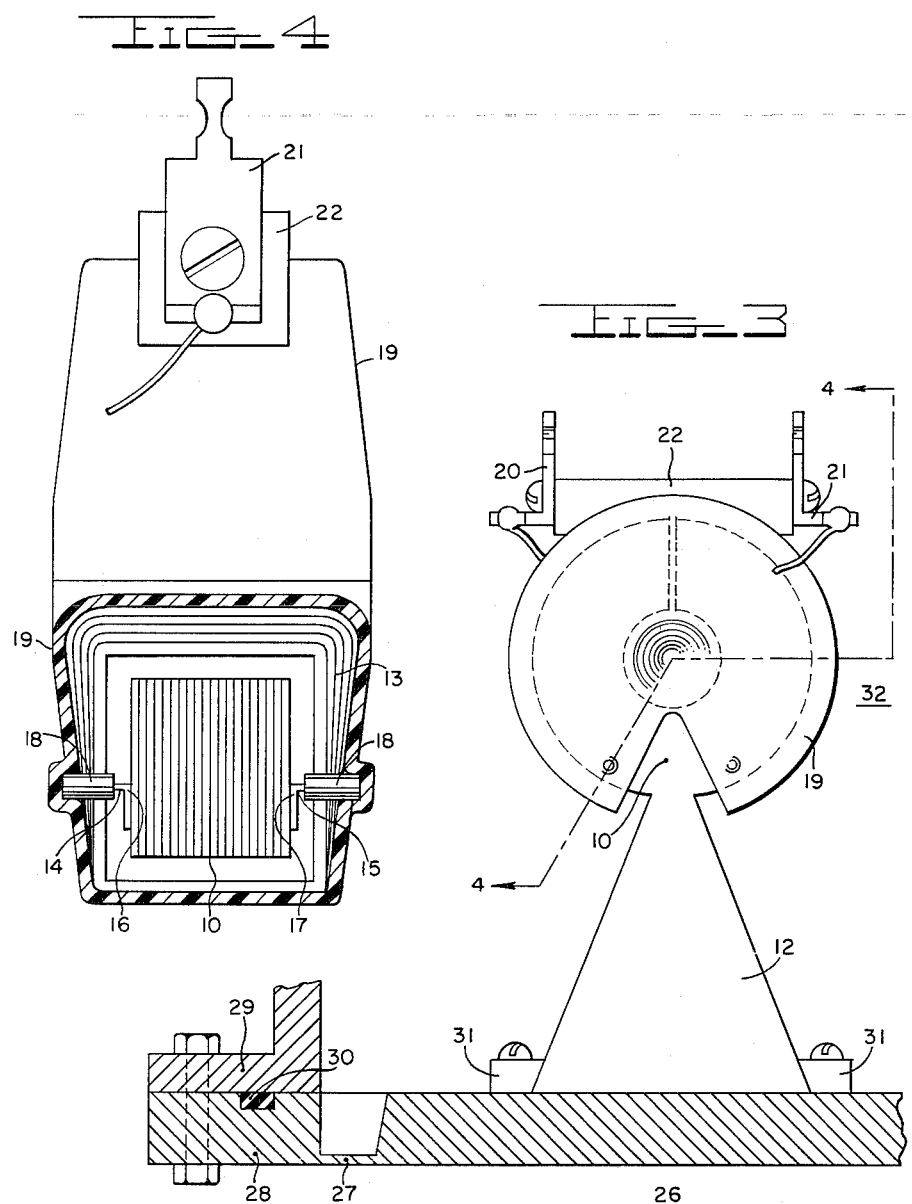

March 28, 1961 B. BERNSTEIN ET AL 2,977,571
SPLIT RING ELECTROACOUSTIC TRANSDUCER
Filed March 26, 1952 4 Sheets-Sheet 3
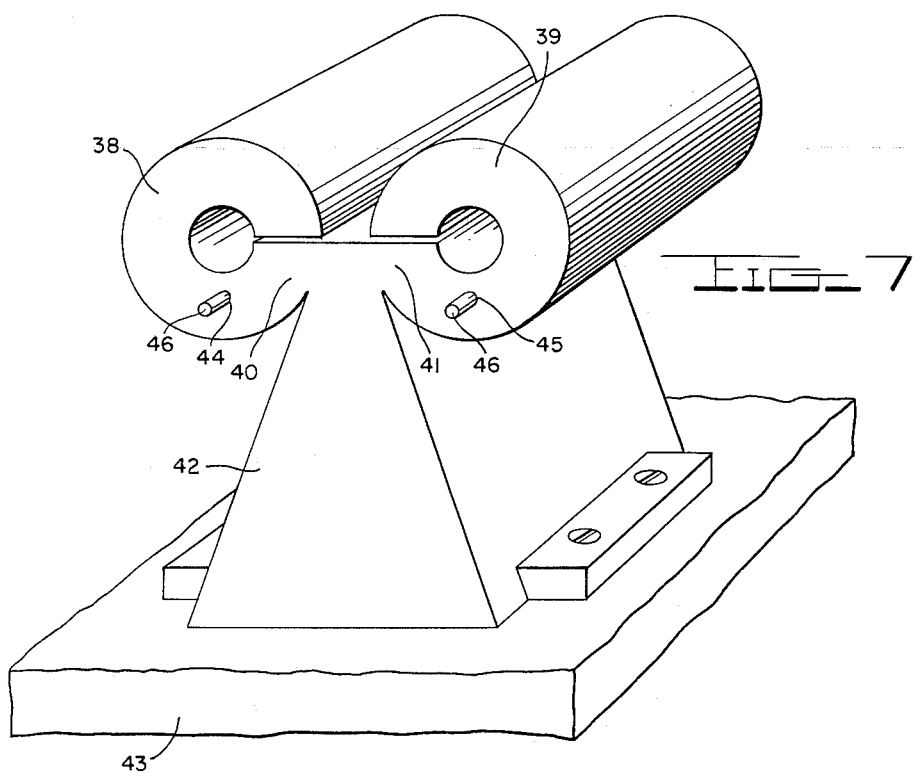
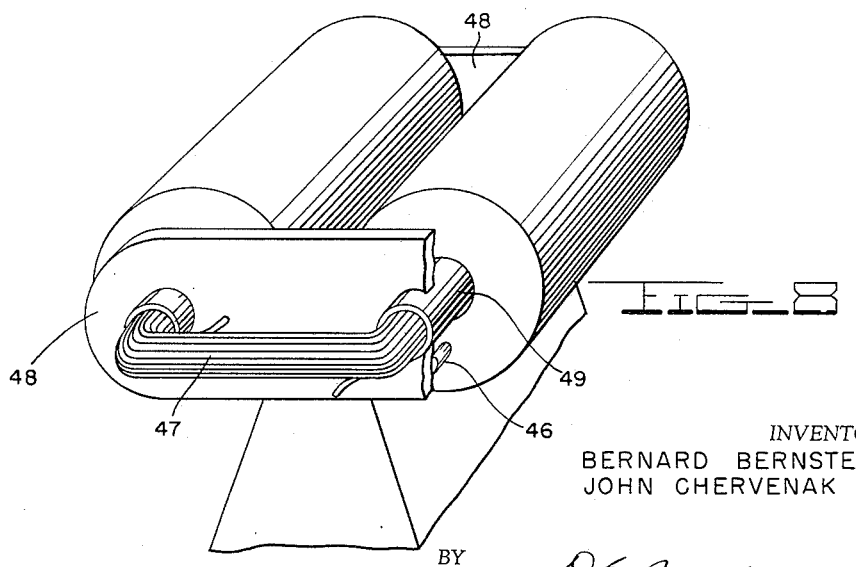
INVENTORS
BERNARD BERNSTEIN
JOHN CHERVENAK
BY D.C. Snyder
Howard White ATTORNEYS March 28, 1961  B. BERNSTEIN ET AL  2,977,571
SPLIT RING ELECTROACOUSTIC TRANSDUCER
Filed March 26, 1952  4 Sheets-Sheet 4

INVENTORS
BERNARD BERNSTEIN
JOHN CHERVENAK

United States Patent Office
2,977,571
Patented Mar. 28, 1961

2,977,571

SPLIT RING ELECTROACOUSTIC TRANSDUCER

Bernard Bernstein, Silver Spring, Md., and John Chervenak, Washington, D.C. (Both of Naval Research Laboratory, Anacostia Station, Washington 25, D.C.)

Filed Mar. 26, 1952, Ser. No. 278,726

7 Claims. (Cl. 340—8)

(Granted under Title 35, U.S. Code (1952), sec. 266)

The present invention relates in general to electroacoustic transducers and more particularly to an electromagnetic electroacoustic transducer element for use singly, or in a group operating with a common vibratory radiating-receiving element.

An object of the invention is the provision of an electromagnetic transducer element small relative to the amount of power which it is capable of handling, and small for a given frequency as compared with magnetostriction or crystal elements.

Another object is the provision of a transducer element capable of sending and receiving compressional wave energy of a frequency high relative to the size of essential parts such as resonating elements and current windings whereby working frequencies may be stepped up without such reduction in size as would render production of the elements unduly difficult.

The above objects are achieved through provision of a novel cooperative combination and arrangement of mechanical and electrical elements for efficient utilization of certain of the modes of vibration of a split ring.

Various other objects and advantages of the invention will become apparent from a perusal of the following specification and the drawings accompanying the same.

In the drawings:

Figure 1 is a face view of one form of vibratory magnetic element constituting an element of the invention.

Figure 2 is a side view showing the laminated structure.

Figure 4 is an enlarged side view partly in section on the line 4—4 of Figure 3.

Figure 5 is a plan view on a small scale showing an array of the transducer elements mounted on a common vibratory plate.

Figure 6 is a modified form of the magnetic ring element and motion transmitting element of Figure 1.

Figure 7 is a perspective view of a modification of the magnetic element utilizing tangential movement of a pair of twinned vibratory split rings.

Figure 8 is a fragmentary perspective view with parts broken away to show the manner of supporting the current coil.

Figure 9 is a plan view on a reduced scale showing an array of the transducer elements of Figures 7 and 8 mounted on a common vibratory plate.

Figure 3:
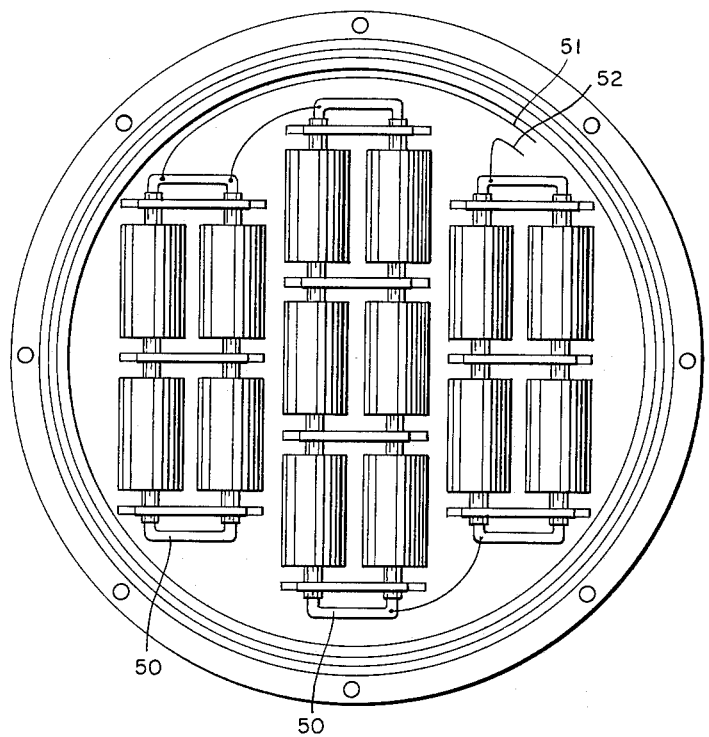
Figure 3 is a front view of a complete transducer element embodying the invention.

Referring to the drawings in detail and first to Figures 1 and 2, these, show, respectively, a face view and a side view of a vibratory magnetic circuit element 10 of general ring form split at 11 to provide an air gap in its magnetic flux path and provided with an integral, motion transmission element 12 in the form of a trapezoidal appendage. The ring 10 and its transmission element 12 are built up of laminations of magnetic material such as silicon steel securely bound together in any known or other suitable manner, in the present instance by cementing with a rubber-base cement known as "cycleweld".

Figures 3 and 4 show the vibratory element above described assembled with a current coil 13 for setting up the desired vibrations of the ring-form element 10 or for translating vibratory movement of the ring into electrical currents. The current coil 13 is provided in the form of a toroid embracing the ring but spaced therefrom by supporting posts 14 and 15. To permit substantially free vibration of the ring relative to the coil without undue mechanical loading of the ring by the coil, the posts 14—15 are secured to the ring at points 16 and 17 (Figure 1) which are nodal points in the vibration of the ring when vibrating in its own plane at a fundamental frequency and in its first mode of vibration. By the term nodal point or node is indicated a point of minimum movement about which either radial or tangential movements may take place. The points where maximum movement occurs are hereinafter termed anti-nodes or loops, and may be either radial or tangential as will hereinafter appear.

The posts 14—15 are secured to the ring as by welding and covered with short sleeves 18 of insulating material such as the flexible insulating tubing known in the electrical arts as "spaghetti". A coating 19, of "Glyptal" or other insulating plastic material, forms with the insulated conductor of the winding a hard unitary shell structure bound to the supporting posts 14—15 by the coating material. Terminals of the winding are carried out and soldered to connecting lugs 20—21 mounted at the ends of a terminal yoke 22 of insulating material bound to the top of the winding shell by the plastic material with which the shell is formed. The upstanding ends of the connecting lugs serve for connection of the winding with a suitable transmitting-receiving circuit not shown.

To effect vibration of the ring the current winding 13 is supplied with both D.C. and A.C. power. The direct current is used as a polarizing current in order to reduce the non-linearity of the device, since the force exerted in the gap is proportional to the flux density. In a particular embodiment constructed as above described, and shown in Figures 1 to 4, the ring has a thickness of approximately 9/16 of an inch, an outer diameter of 1 13/16 of an inch and an inside diameter of 12/16 of an inch. The motion transmitting extension 12 is of the same thickness as the ring portion and approximately 2 inches in length from where it joins the ring periphery to its base. With an A.C. power of proper frequency, in the present instance about 5000 cycles per second, the ring is set in vibration at its fundamental frequency in the first mode in its own plane. With this mode of vibration, when the two arcs forming the two sides of the ring move away from each other at the gap, the motion transmitting stem 12 moves up, and as the arcs move toward each other at the gap the stem moves down.

In the mode of vibration thus set up, there exists two nodes at the points 16—17 spaced angularly on the ring at approximately 30° each side of the vertical center line. This forms an antinode or loop portion of maximum radial displacement at the point 25 with substantially no tangential component. Obviously an antinode or loop portion of maximum tangential displacement occurs at each side of the gap 11.

In the present instance mechanical power or compressional wave energy is taken off at the radial loop portion 25 for transmission through the element 12 to a vibratory radiating-receiving element 26 (Figure 3). The element 26 is, as usual in the art, in the form of a circular plate mounted in known manner to permit piston-like vibratory movement as through a peripheral relatively thin compliance ring 27 to an integral mounting ring 28 bolted to the rim 29 of a suitable casing or housing shown only in part, with an intervening gasket 30, all in a manner well known in the art. The connecting element 12 is secured to the plate by cementing with a suitable cementing material such as "cycleweld." Clamping lugs 31 used to clamp the element 12 in place during cementing may remain in place with advantage. In Figure 3, the numeral 32 indicates the transducer element as a whole.

In use a plurality of the units 32 are secured on the common plate 26 in suitable array which may be a circular array as indicated in Figure 5, the elements being so spaced that each will serve substantially a like portion of the mass of the plate 26.

In operation as a transmitter a polarizing direct current is supplied to the current coils 13 of the elements to establish a magnetic field of given normal or mean strength in the gaps 11, and superimposed thereon is an alternating or cyclically varying signal current of a given frequency substantially equal to that at which the ring 19 vibrates in the first mode above described. This sets up a resonant vibration of the ring in the first mode with mechanical vibrational energy transmitted from the radial vibrational loop point 25 through the transmission element 12 to the plate 26 from whence the energy is radiated into the contacting propagating medium, in the present instance, water.

In use as a receiver also polarized, compressional waves at the plate 26 set the latter in vibration which vibrations are transmitted through the transmission element 12 to the rings 10 to vary the width of the gaps 11 thereby transforming vibrations imposed on the rings into signal currents in the current windings 13 to be detected, recorded or otherwise manifested in known manner.

Where it is desired to produce a transducer element for higher frequencies without undue reduction in size of its constituent parts, the modification shown in Figure 6 is used. Here the ring 60 with air gap 61 and motion transmitting element 62 is similar in all respects to that of Figures 1 to 4 except that the motion transmitting element 62 connects with the ring to take radial vibrations from the ring near a point 33 about 55° to one side of the radius diametrically opposite the gap. This location of a radial antinode or loop is established when the ring vibrates in its second mode which occurs at a substantially critical frequency slightly higher than twice that of the first mode for a ring of the same dimensions. As indicated in Figure 6, when the ring is resonating in the second mode, pseudo nodes as to radial vibration occur at the points 34, 35, and 36, while antinodes or loops as to radial vibration occur at points 33 and 37.

A preferred form of the invention is one utilizing the tangential movement of a split ring near one side of the gap. The geometry of the vibrating element of such a form is shown in Figure 7. Here the element takes the shape of a twin element consisting of a pair of split rings 38 and 39 arranged with the gaps aligned and facing each other, and with a pair of adjacent ends 40—41 of the two rings on the same side of the aligned gaps connected to each other and to a common motion transmitting element 42. The element 42 transmits motion from the ends 40—41 to a vibratory radiating-receiving plate 43, such as the plate 26 of Figure 3, common to a group of such twin elements. With the twin element having the geometry here shown, vibrating at its natural or fundamental frequency, nodes occur at points 44 and 45 in each ring. The natural or fundamental frequency is that which produces a mode of vibration giving the maximum displacement in a direction longitudinally of the transmission element 42. In underwater sound it is desirable to obtain certain water Q's for a given frequency. In this device, calling the lower portion of the twin transducer element with its share or apportionment of the common plate 43 the "radiating end," and the upper portion above the nodes 44—45 the "free end," one of the ways to vary its water Q is to vary the mass ratio, that is, the ratio of the mass of the radiating end to the mass of the free end. This is accomplished by varying the area of the connection between 42 and the periphery of the rings and then varying the mass of 42 to keep the frequency constant.

In the particular element shown in Figure 7 the physical dimensions are about as follows: Inner diameter of rings ½ in., space between rings at upper side of gap ⅜ in., length of stem 42, 3 in., thickness of plate 43, 1 inch. The thickness or depth measured parallel to the axes of the rings may be any desired value, in the present instance about equal to the length of the stem 42 or about 2½ inches. However the depth or thickness of the element has substantially no effect in determining the frequency. In the particular unit here shown the dynamic mass ratio of the "radiating end" to the "free end" is about 4 to 1. The fundamental frequency or that at which highest efficiency is attained is about 5000 cycles per second.

A common current coil may be used for the twin rings and to enable the coil to be supported substantially free of motion derived from the rings, supporting lugs 46 are provided secured to the nodal points 44—45 on the rings. The lugs may be of any known or other suitable firm but slightly pliable material in the present instance a cork composition known as "corprene" having somewhat the physical characteristics of cork, leather or linoleum. The lugs 46 are cemented to the nodal points on the rings by a suitable strong cement such as "cycleweld." As shown in Figure 8 the current coil 47 is held in a pair of bracket plates 48 of Bakelite or similar material cemented to the lugs 46. A pair of tubular coil-casings 49 of Bakelite or similar material support the coil where it passes through the rings, the tubes passing through holes in the brackets for support thereby. The outside diameter of these tubes are smaller than the holes in the rings by such a margin as not to impede the maximum amplitude of vibration that the rings may execute. The tubes facilitate the building up of the coil by acting as guides in threading the wires around through the rings. The wire strands in the loops at the ends of the coil may be bound together in any known or other suitable manner as by a binding tape or with a plastic coating such as "Glyptal" as in the case of Figures 3 and 4.

Because a multiplicity of units are mounted on a common radiating-receiving plate 43 the provision of a coil individual to each unit as in Figure 8 makes for convenience in maintenance where replacement of single units are necessary. On the other hand groups of two or more units may be provided with a common coil as shown at 50 in Figure 9. Here is shown an array of a multiplicity of units mounted in aligned groups on the common vibratory plate 43 with a single coil 50 for each aligned group, the terminals of each coil being connected in series to a pair of leads 51—52 for connection with any known or other suitable form of transmitting-receiving apparatus. In a manner well known in the art, the units may be connected in parallel, or in small series groups connected in parallel.

For the sake of clearness a small number of units somewhat widely distributed are shown in the assemblage of Figure 9 but it will be understood that in practice many times this number are arranged in as close and even a distribution as possible over the common vibratory plate.

While herein has been shown and described certain specific embodiments of the invention for the sake of disclosure, it is to be understood that the invention is not limited to such specific embodiments but contemplates all such modifications and variants thereof as fall fairly within the scope of the appended claims.

The invention described herein may be manufactured and used by or for the Government of the United States of America for governmental purposes without the payment of any royalties thereon or therefor.

What is claimed is:

1. An electromagnetic electroacoustic transducer element comprising, at least one magnetic circuit element of magnetic material of general ring-form split to provide an air gap in its magnetic flux path and to form, as part of the ring structure, portions of maximum tangential vibration in the plane of the ring situated close to and on each side of the gap and a portion of maximum radial vibration situated opposite the gap, a current coil for said ring extending through the ring and spaced therefrom to avoid undue loading of the ring-form element and undue vibration of the coil and to permit free vibratory movement of the ring relative to the coil, and a substantially rigid motion transmitting element for connection to and support by a vibratory compressional wave radiating-receiving element, said transmission element being connected to the ring at one of said portions of maximum vibration.

2. An electromagnetic electroacoustic transducer element comprising, at least one magnetic circuit element of magnetic material of general ring-form split to provide an air gap in its magnetic flux path and to form, as part of the ring structure, portions of maximum tangential vibration in the plane of the ring situated close to and on each side of the gap and a portion of maximum radial vibration situated opposite the gap, a current coil for said ring extending through the ring and spaced therefrom to avoid undue loading of the ring-form element and undue vibration of the coil and to permit free vibratory movement of the ring relative to the coil, a vibratory plate for effecting an acoustic couple with a fluid medium through which compressional waves are to be transmitted and received, and a substantially rigid motion transmitting element connecting said plate and the ring at one of said portions of maximum vibration.

3. An electromagnetic driving element for electroacoustic transducers comprising, at least one magnetic circuit element of magnetic material of general ring-form split to provide an air gap in its magnetic flux path and to form, as part of the ring structure, portions of maximum tangential vibration in the plane of the ring situated close to and on each side of the gap and a portion of maximum radial vibration situated opposite the gap with a pair of nodal portions situated one on each side of the ring between the gap and the portion of maximum radial vibration, a current coil for said ring spaced therefrom to avoid undue loading of the ring-form element and undue vibration of the coil and to permit free vibratory movement of the ring relative to the coil, said coil being supported by the ring at at least one of said nodal portions, and a substantially rigid motion transmitting element for connection to and support by a vibratory element, between which and the ring vibrations are to be transmitted, said transmission element being connected to the ring at one of said portions of maximum vibration.

4. An electromagnetic electroacoustic transducer element comprising, at least one magnetic circuit element of magnetic material of general ring-form split to provide an air gap in its magnetic flux path and to form, as part of the ring structure, portions of maximum tangential vibration in the plane of the ring situated close to and on each side of the gap, a portion of radial vibration situated opposite the gap and at least two nodal portions, a toroidal coil embracing said ring and spaced therefrom to avoid undue loading of the ring-form element and undue vibration of the coil and to permit free vibratory movement of the ring relative to the coil, said coil being supported by the ring at two said nodal portions, and a motion transmitting element for connection to and support by a compressional wave radiating-receiving element, said transmitting element being connected to the ring at one of said portions of maximum vibration.

5. An electroacoustic transducer element comprising, a magnetic circuit element of magnetic material in the form of a pair of rings each split to provide two free ends with a gap between, the two split rings being joined together integrally at one free end of each, a substantially rigid motion transmitting element extending from the joined portion of the rings substantially tangentially of the rings and a current winding extending through the rings.

6. An electromagnetic transducer having a plurality of transducer elements each comprising a magnetic circuit element of magnetic material in the form of a pair of rings in a common plane each split to provide two free ends with a gap between, the two split rings being joined together integrally at one free end of each, a substantially rigid motion transmitting element extending from the joined portions of the rings substantially tangentially of the rings, said rings providing a mode of vibration in their common plane having nodes between the joined ends and the unconnected ends, and a current winding extending through the rings, together with a vibratory transmitting-receiving element common to all said transducer elements, said motion transmitting elements being connected to the common vibratory element each to a like portion of the vibratory element, each said like portion together with the portion of its associated transducer element on the near side of the nodes having a dynamic mass ratio to the remaining portion of the transducer element of approximately 4 to 1.

7. In an electroacoustic transducer, a plurality of dynamoelectric elements each comprising a plurality of laminations of magnetic material cemented together, each lamination being in the form of a pair of flat rings, each ring split to provide ends with an air gap between, the two split rings being joined together at one end of each with a substantially rigid motion transmitting portion extending tangentially from the joined portions of the rings, said rings providing a mode of vibration in their common plane having a loop of tangential vibration common to both rings at the joined portions of the rings, and an energizing winding extending through the rings, said motion transmitting portions being connected to a common vibratory radiating-receiving element, the said motion-transmitting portions each being in the form of a trapezoid joining with the rings at its apex and with the common vibratory element at its base.

References Cited in the file of this patent
UNITED STATES PATENTS

| | | |
|---|---|---|
| 252,256 | Rogers | Jan. 10, 1882 |
| 1,380,869 | Fay | June 7, 1921 |
| 1,882,398 | Pierce | Oct. 11, 1932 |
| 2,568,186 | Crawford | Sept. 18, 1951 |